United States Patent
Stark

(10) Patent No.: US 9,200,829 B2
(45) Date of Patent: Dec. 1, 2015

(54) LOW TEMPERATURE COOLING AND DEHUMIDIFICATION DEVICE WITH REVERSING AIRFLOW DEFROST FOR APPLICATIONS WHERE COOLING COIL INLET AIR IS ABOVE FREEZING

(71) Applicant: Walter Stark, Centerport, NY (US)

(72) Inventor: Walter Stark, Centerport, NY (US)

(*) Notice: Subject to any disclaimer, the term of this patent is extended or adjusted under 35 U.S.C. 154(b) by 168 days.

(21) Appl. No.: 14/034,896

(22) Filed: Sep. 24, 2013

(65) Prior Publication Data
US 2015/0082824 A1    Mar. 26, 2015

(51) Int. Cl.
| F25D 21/04 | (2006.01) |
| F24F 3/14 | (2006.01) |
| F24F 12/00 | (2006.01) |
| F24F 11/00 | (2006.01) |

(52) U.S. Cl.
CPC . *F25D 21/04* (2013.01); *F24F 3/14* (2013.01); *F24F 12/006* (2013.01); *F24F 2011/0087* (2013.01)

(58) Field of Classification Search
CPC ..... F25D 21/04; F25D 232/17; F25B 270/21; F25B 2313/027; F25C 240/20; F25C 5/005
USPC ......................... 62/92, 93, 271, 272, 187, 408
See application file for complete search history.

(56) References Cited

U.S. PATENT DOCUMENTS

| 2,347,601 | A | * | 4/1944 | Jackson ........................ 34/557 |
| 2,481,348 | A | * | 9/1949 | Ringquist et al. ............ 62/151 |
| 2,763,132 | A | * | 9/1956 | Jue .................................. 62/81 |
| 3,257,816 | A |   | 6/1966 | Parce |
| 3,572,052 | A |   | 3/1971 | Toth |
| 3,732,703 | A | * | 5/1973 | Nordstrom et al. ......... 62/324.3 |
| 3,990,260 | A |   | 11/1976 | Eustis |
| 4,250,917 | A | * | 2/1981 | Jespersen et al. ............ 137/563 |
| 4,350,021 | A | * | 9/1982 | Lundstrom ..................... 62/150 |
| 4,566,531 | A | * | 1/1986 | Stolz ............................... 165/42 |
| 5,369,964 | A | * | 12/1994 | Mauer et al. .................... 62/420 |
| 5,400,607 | A | * | 3/1995 | Cayce ............................ 62/90 |
| 5,553,462 | A |   | 9/1996 | Taylor |
| 5,694,782 | A |   | 12/1997 | Alsenz |
| 5,816,315 | A | * | 10/1998 | Stark .............................. 165/66 |
| 5,865,033 | A | * | 2/1999 | Gossler ........................... 62/81 |
| 5,890,368 | A |   | 4/1999 | Lakdawala |
| 5,913,360 | A | * | 6/1999 | Stark .............................. 165/66 |
| 6,021,644 | A |   | 2/2000 | Ares et al. |
| 6,082,125 | A |   | 7/2000 | Savtchenko |

(Continued)

FOREIGN PATENT DOCUMENTS

| AU | 2012321841 A1 | 11/2010 |
| CA | 1301739 B1 | 8/1988 |

(Continued)

*Primary Examiner* — Mohammad M Ali
(74) *Attorney, Agent, or Firm* — Alfred M. Walker

(57) ABSTRACT

A low temperature cooling and dehumidification system uses a reverse airflow arrangement to defrost a frosted cooling coil while not interrupting operation. Automatic air dampers are used to reverse the airflow at the proper time to initiate defrost of that section of frosted cooling coil. This system is useful for low temperature cooling and dehumidification in situations where the inlet air is above freezing, however exiting air below freezing can be supplied if desired. It is advantageous for operation if the coolant flow and temperature internal to the cooling coil are regulated to create the conditions for frost formation to begin closer to the air leaving side of the active cooling coil.

9 Claims, 8 Drawing Sheets

A CIRCUIT FLOW

(56) References Cited

U.S. PATENT DOCUMENTS

| | | | |
|---|---|---|---|
| 6,131,653 A * | 10/2000 | Larsson | 165/228 |
| 6,427,454 B1 | 8/2002 | West | |
| 6,715,713 B2 * | 4/2004 | Marche | 244/57 |
| 7,581,408 B2 * | 9/2009 | Stark | 62/93 |
| 8,202,146 B1 * | 6/2012 | Johnson et al. | 454/187 |
| 8,256,497 B2 * | 9/2012 | Gietzen | 165/54 |
| 8,316,660 B2 | 11/2012 | DeMonte et al. | |
| 2005/0091993 A1 | 5/2005 | Paradis | |
| 2006/0172676 A1 | 8/2006 | Ebner et al. | |
| 2010/0170280 A1 * | 7/2010 | Narikawa et al. | 62/271 |
| 2011/0168793 A1 * | 7/2011 | Kreft et al. | 236/44 C |
| 2013/0055735 A1 | 3/2013 | DeMonte et al. | |

FOREIGN PATENT DOCUMENTS

| | | |
|---|---|---|
| CN | 102645080 A | 8/2012 |
| CN | 202582032 A1 | 12/2012 |
| GB | 1301127 A1 | 12/1972 |
| JP | 62023810 A1 | 1/1987 |
| JP | 62066032 A1 | 3/1987 |
| JP | 07000751 A1 | 6/1995 |
| WO | 2009011628 A1 | 1/2009 |
| WO | 2011063199 A3 | 5/2011 |

* cited by examiner

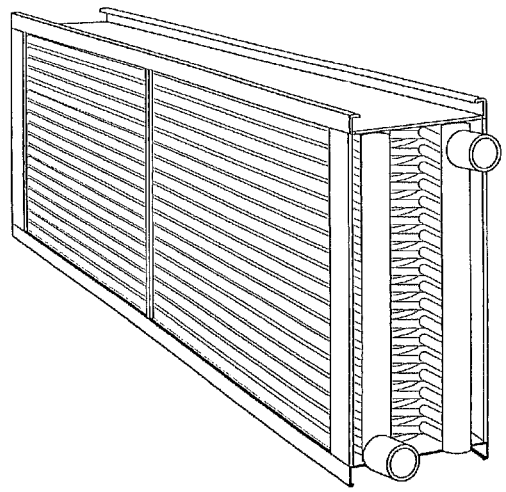
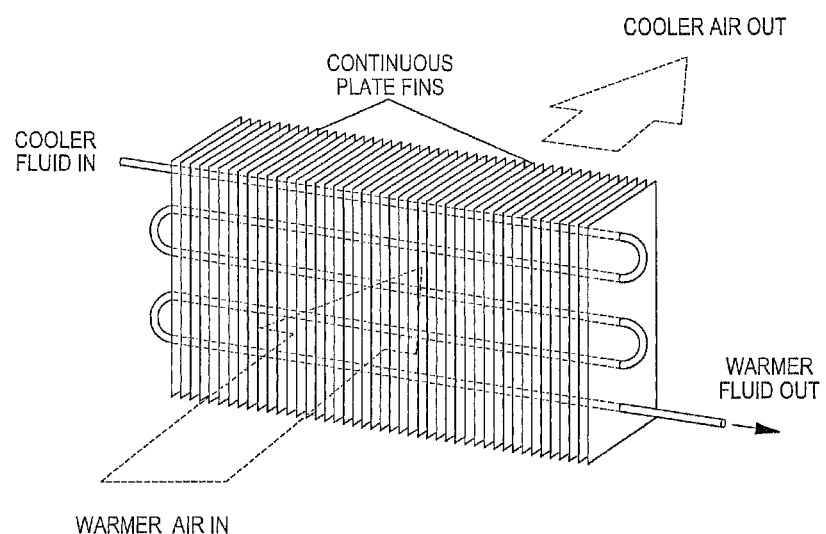
FIG. 1 (PRIOR ART)
FINNED - TUBE
COOLING COIL

SINGLET WO-PASS COIL
NO HEAT EXCHANGER

SINGLE ONE-PASS COIL
NO HEAT EXCHANGER

MULTIPLE ONE-PASS COILS
NO HEAT EXCHANGER

SINGLE TWO-PASS COIL
MULTIPLE HEAT EXCHANGERS

MULTIPLE ONE-PASS COILS
MULTIPLE HEAT EXCHANGERS

SINGLE TWO-PASS COIL
SINGLE HEAT EXCHANGER

SINGLE ONE-PASS COIL
SINGLE HEAT EXCHANGER

MULTIPLE ONE-PASS COILS
SINGLE HEAT EXCHANGER

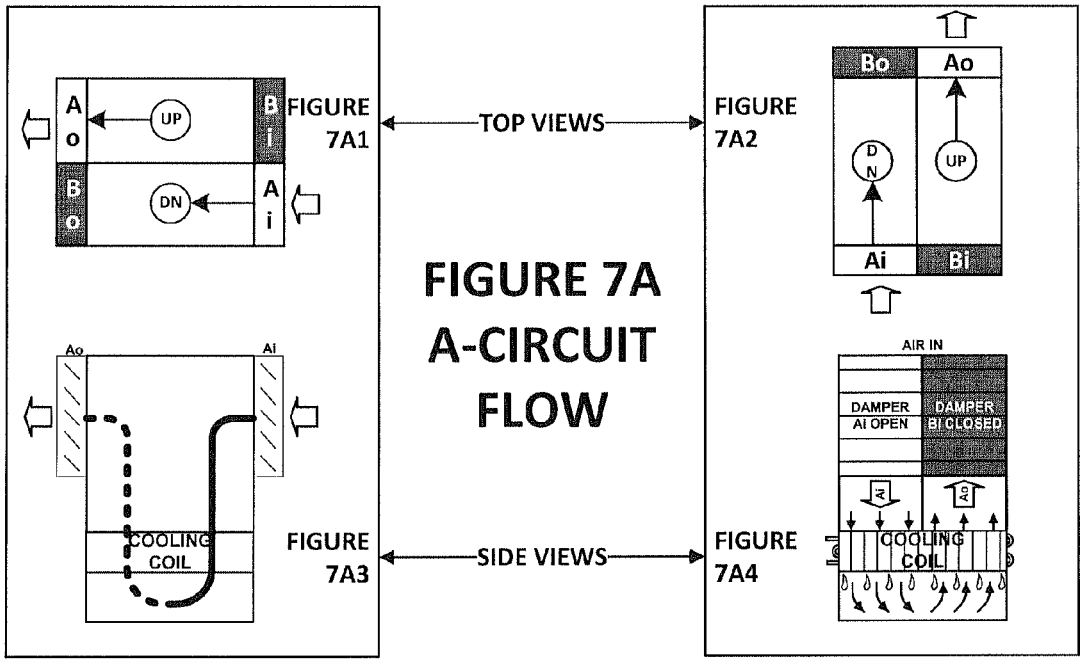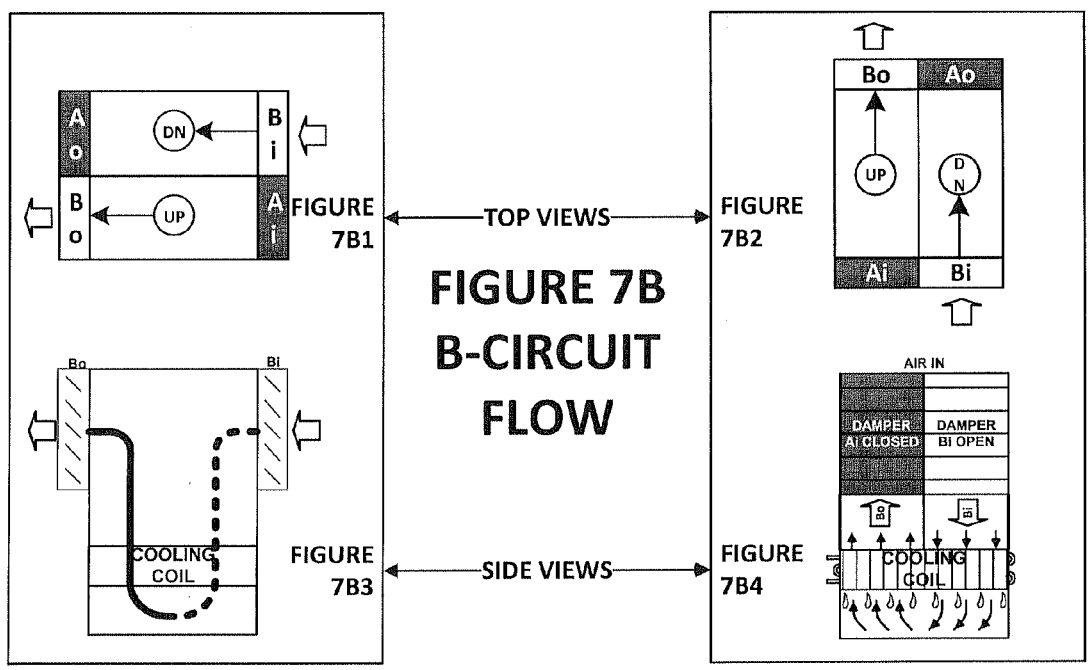

A-CIRCUIT FLOW

B-CIRCUIT FLOW

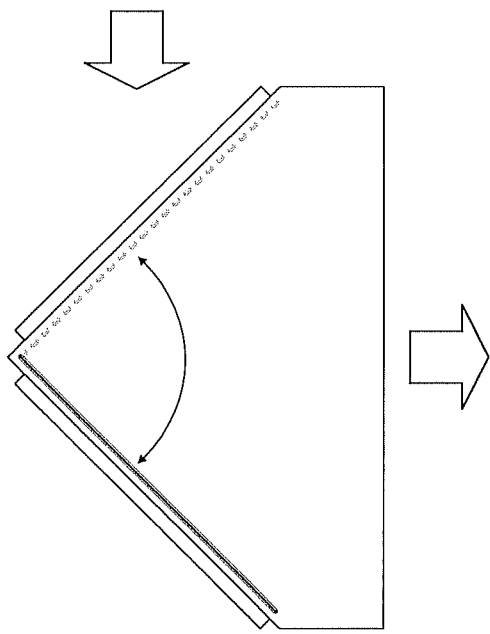
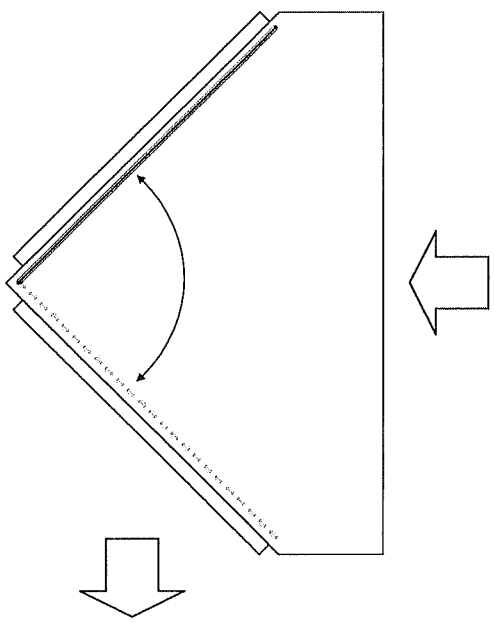
FIGURE 9
SWING DAMPER

SLIDE DAMPER

A CIRCUIT FLOW

B CIRCUIT FLOW

LOW TEMPERATURE COOLING AND DEHUMIDIFICATION DEVICE WITH REVERSING AIRFLOW DEFROST FOR APPLICATIONS WHERE COOLING COIL INLET AIR IS ABOVE FREEZING

FIELD OF THE INVENTION

The present invention relates to using reverse airflow defrost in low temperature cooling and dehumidification systems, where inlet air is above freezing.

BACKGROUND OF THE INVENTION

Low temperature air cooling is needed to maintain low dew point temperatures in spaces such as hospital operating rooms, archival storage, indoor ice rinks, supermarkets etc . . .

Mechanical cooling and dehumidification systems are generally restricted to delivering air temperatures safely above freezing to avoid complications associated with frost buildup in the cooling coil and subsequent air restriction.

Cooling coils typically comprise tubes, through which flows a coolant such as water, brine or a refrigerant. The inner surface of the tubes can have enhancements to improve heat transfer between the coolant and the tube. Air, flows over the outside of the tubes where fins can be added to enhance heat transfer between the tube and air. The coolant inside the tubes removes heat from the air and thus cools the air.

Frost formation begins during operation when coolant temperature is below freezing and air temperature reaches saturation. Frost accumulates over time and eventually restricts airflow, requiring some means for defrosting.

Defrosting may employ introduction of hot gas, from a refrigeration plant, injected into the tubes, thereby defrosting from the inside out. This introduction of heat to a cooling process interrupts operation and is inefficient, resulting in an increase in overall energy consumption.

SUMMARY OF THE INVENTION

This invention uses a reverse airflow arrangement to defrost. Cooling coil airflow is reversed, and the coldest section of the cooling coil becomes the warmest, thereby promoting defrost, while also keeping the energy, given up by melting frost, in the airstream. This provides an energy efficient means for defrosting while not interrupting operation.

In a first embodiment of the invention, a single two-pass cooling coil is used (see FIGS. 1A, 3 and 5A). Warmer air, entering the first pass of this cooling coil arrangement, is least vulnerable to frosting. Coolant flow and temperature is regulated so that frost begins largely in the second pass of the cooling coil. When the frost threshold is reached, airflow through the cooling coil is reversed, and frost is now exposed to warmer entering air, giving up its heat to the airstream and defrosting the cooling coil. Meanwhile, new frost begins to form on the former first pass (now second pass) of the cooling coil.

In a second embodiment of the invention, multiple one-pass cooling coils are used (see FIGS. 1B, 2, 4, 5B and 6A). In this embodiment, one cooling coil is active, while the other is defrosting. This option offers the ability to control to lower dew point temperatures because the active cooling coil may operate at low temperatures while the defrosting cooling coil can be inactive or operating at diminished capacity. When the frost threshold is reached, airflow through the cooling coil is reversed, coolant flow to the defrosting cooling coil is inactive or diminished, coolant flow to the defrosted cooling coil is active, and frost is now exposed to warmer entering air, giving up its heat to the airstream and defrosting the cooling coil. Meanwhile, new frost begins to form on the defrosted and active cooling coil.

A manifold assembly employing dampers (Ai, Bi, Ao and Bo) to reverse air flow through a cooling coil without interrupting operation. Damper designation is "A" or "B" to designate flow path and "i" or "o" to designate inlet or outlet air damper. The dampers change positions to reverse the airflow across the cooling coil so that frost near the former outlet (now inlet) section can defrost, while frost can accumulate on the former inlet (now outlet) section. Flow reversal is also designated by UP and DN (down) in the illustrations. Airflow through the device, is fixed in one direction. Irrespective of the direction of airflow through the cooling coil, the external geometric path of the airflow through the device remains constant.

BRIEF DESCRIPTION OF DRAWINGS

The present invention can best be understood in connection with the accompanying drawings. It is noted that the invention is not limited to the precise embodiments shown in drawings, in which:

FIG. 1 shows two perspective views of a typical cooling coil as used in the prior art as well as in this invention; both a schematic view showing airflow pattern as well as pictorial view of a cooling coil in a horizontal position are shown.

FIGS. 1A through 6 depict cooling coil arrangements in relation to systems with and without heat exchangers, where flow direction is reversible and therefore direction is not shown;

FIG. 1A depicts a two-pass single cooling coil arrangement;

FIG. 2 depicts a two-pass dual cooling coil arrangement;

FIG. 3 depicts a two-pass single cooling coil arrangement with multiple heat exchangers;

FIG. 4 depicts a two-pass multiple cooling coil arrangement with multiple heat exchangers;

FIG. 6 depicts a two-pass dual cooling coil arrangement with a single heat exchanger;

FIGS. 7A & 7B is a series of drawings that depict both A and B circuit airflow through the device, with damper positioning to achieve each where the generic device is shown without heat exchangers and with a single two-pass cooling coil, and wherein one pass cooling coil is also possible as is multiple cooling coils, shown in FIGS. 1-2;

FIGS. 7A1 and 7A2 are top views projected from the side view below and showing Circuit-A air entering at damper Ai, and continuing down through the cooling coil and then up, exiting at damper Ao, thereby creating a flow direction through the cooling coil defined by Circuit A;

FIGS. 7A3 and 7A4 are views from two sides of the device showing Circuit-A air entering damper Ai and continuing (solid line) through the cooling coil and turning upward (dotted line), leaving damper Ao thereby creating a flow direction through the cooling coil defined by Circuit A;

FIGS. 7B1 and 7B2 are top views projected from the side view below and showing Circuit-B air entering at damper Bi, and continuing down through the cooling coil and then up, exiting at damper Bo thereby creating a flow direction through the cooling coil defined by Circuit B;

FIGS. 7B3 and 7B4 are views from two sides of the device showing Circuit-B air entering damper Bi and continuing (dotted line) through the cooling coil and turning upward (solid line), leaving damper Bo thereby creating a flow direction through the cooling coil defined by Circuit B;

FIGS. 8A1 and 8A2 are top views projected from the side view below and showing Circuit A air entering at damper Ai, and continuing down through the cooling coil and then up, exiting at damper Ao thereby creating a flow direction through the cooling coil defined by Circuit A FIGS. 8A3 and 8A4 are views from two sides of the device showing Circuit-A air entering damper Ai and continuing (solid line) through the heat exchanger and cooling coil and then turning upward (dotted line), leaving damper Ao thereby creating a flow direction through the cooling coil defined by Circuit A FIGS. 8B1 and 8B2 are top views projected from the side view below and showing Circuit B air entering at damper Bi, and continuing down through the cooling coil and then up, exiting at damper Bo thereby creating a flow direction through the cooling coil defined by Circuit B FIGS. 8B3 and 8B4 are views from two sides of the device showing Circuit-B air entering damper Bi and continuing (dotted line) through the heat exchanger and cooling coil and then turning upward (solid line), leaving damper Bo thereby creating a flow direction through the cooling coil defined by Circuit B FIG. 9 are views of a possible swing damper option, shown in two positions FIG. 10 are views of a possible slide damper option, shown in two positions

DETAILED DESCRIPTION OF THE INVENTION

The device of this invention uses a reverse airflow arrangement to defrost a frosted cooling coil while not interrupting operation. Automatic air dampers are used to reverse the airflow when the defrost threshold is reached. Any type of serviceable damper such as a swing damper or a louvered damper can be used. This system is useful for low temperature cooling and dehumidification in situations where the cooling coil inlet air is above freezing, however exiting air below freezing can be supplied if desired. It is advantageous for operation if the coolant flow and temperature internal to the cooling coil are regulated to create the conditions for frost formation to begin closer to the air leaving side of the active cooling coil.

FIG. 1 shows a schematic representation 1 of a typical cooling coil illustrating airflow through the cooling coil. Also shown in FIG. 1 is a perspective view of cooling coil 2 in a horizontal position.

Figure 1A:
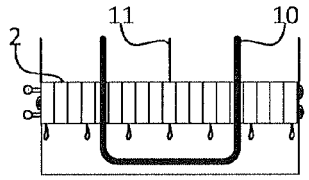
Figure 1B:
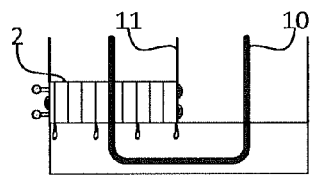
FIG. 1B depicts a one-pass single cooling coil arrangement.
Figure 2:
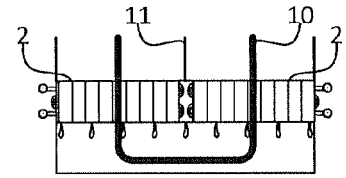

A wide variety of cooling coil arrangements compatible with this invention is shown in FIGS. 1A through 6. Both single-pass as well as two-pass systems with and without heat exchangers are shown. Airflow 10 is shown as a bold line or lines in this group of figures. FIG. 1A shows a two-pass system using a single cooling coil 2 and no heat exchanger. An airflow partition 11 is used to separate inlet from outlet flows. FIGS. 1B and 2 show other variations without heat exchangers as described in the aforementioned Brief Description of the Drawings. FIGS. 3 through 6 depict arrangements with heat exchangers 12. It is noted that four separate cooling coils 2 and two heat exchangers 12 are shown in a two-pass configuration in FIG. 4.

Figure 4:
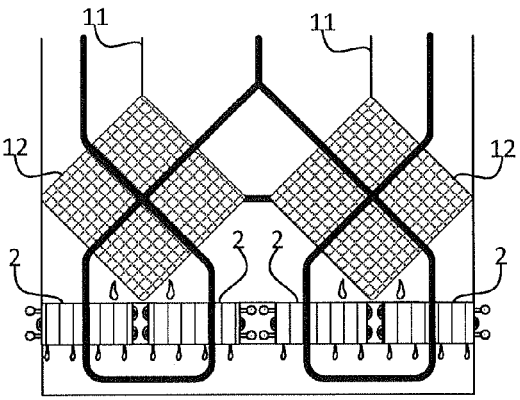
Figure 5A:
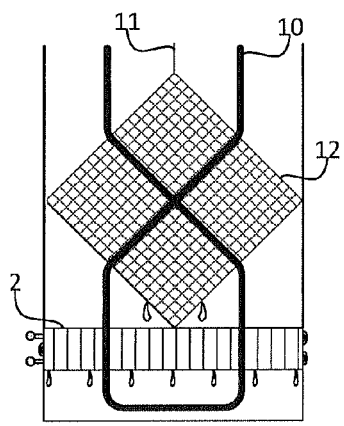
FIG. 5A depicts a two-pass single cooling coil arrangement with a single heat exchanger.
Figure 5B:
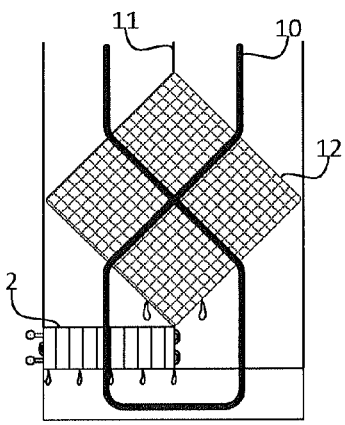
FIG. 5B depicts a one-pass single cooling coil arrangement with a single heat exchanger.
Figure 6:
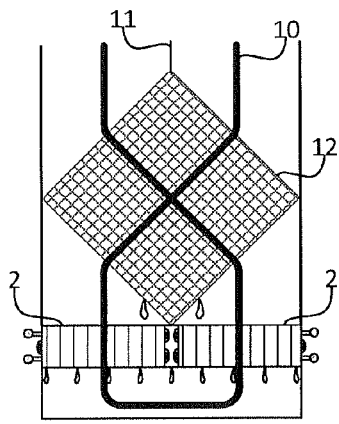
Figure 11:
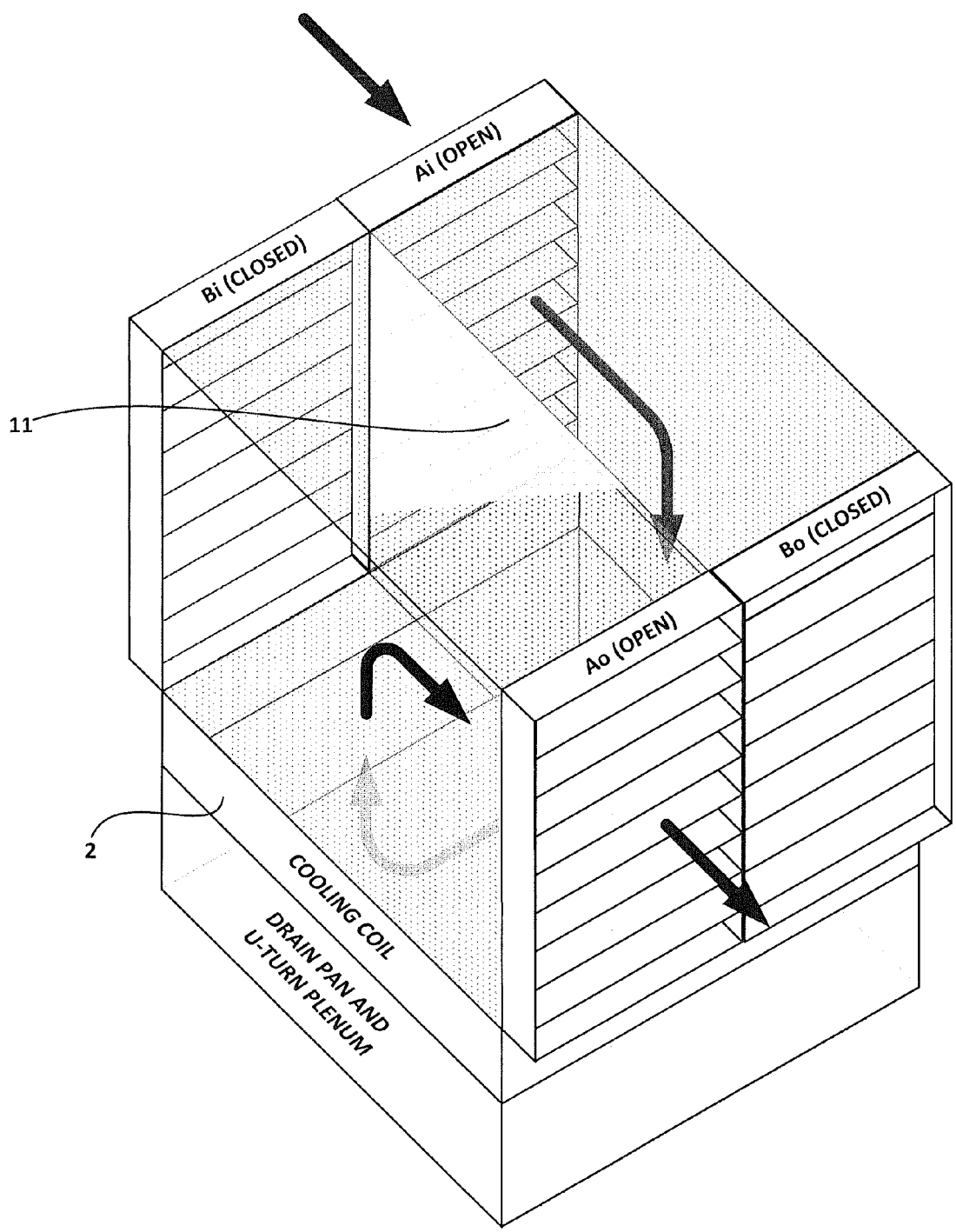
FIG. 11 illustrates the three dimensional airflow internal to circuit A consistent with FIGS. 7A1-7A4.
Figure 12:
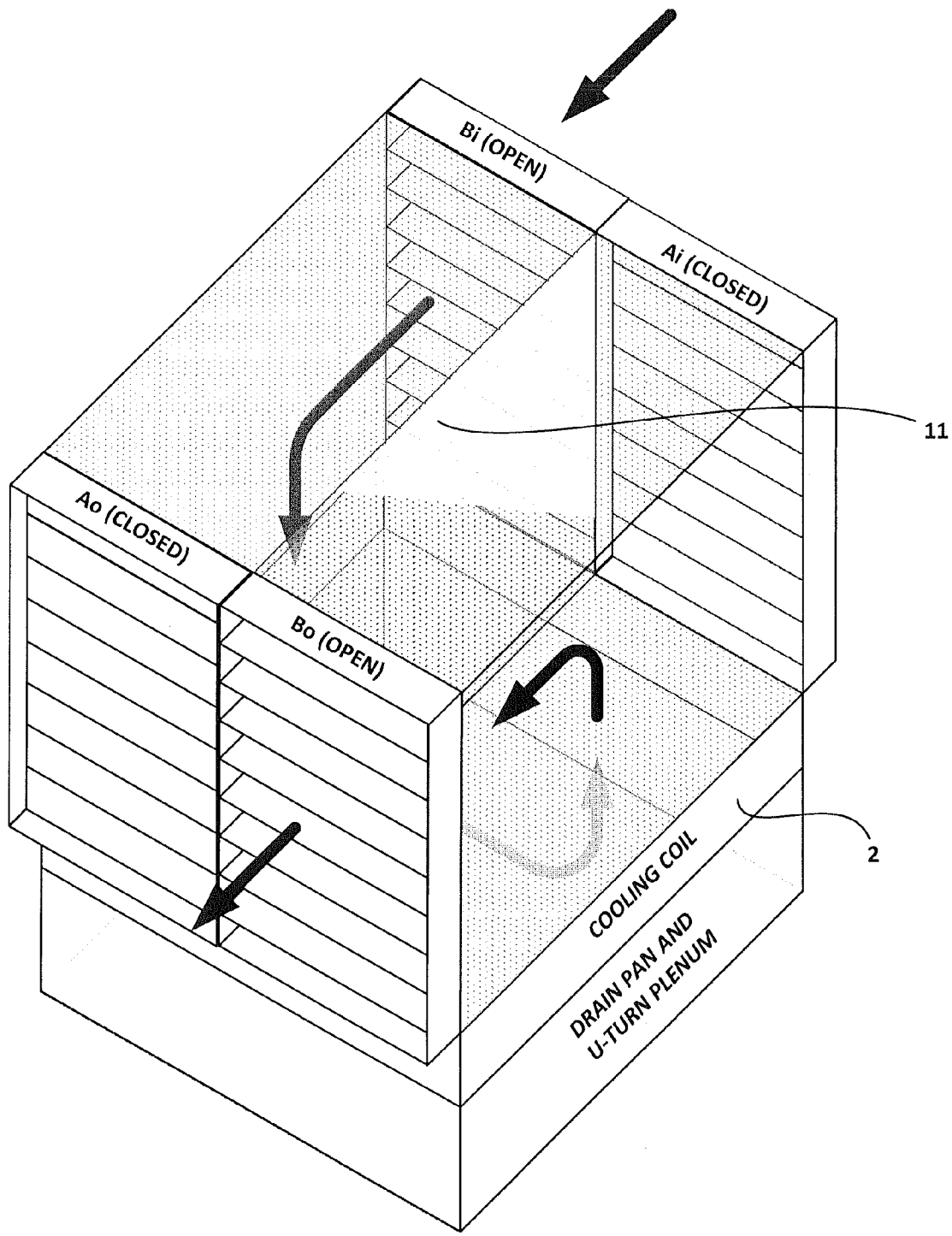
FIG. 12 illustrates the three dimensional airflow internal to circuit B consistent with FIGS. 7B1-7B4.

Flow patterns for configurations without heat exchangers are schematically illustrated for a single direction of airflow in FIGS. 7A1-7A4. FIG. 11 is a three dimensional representation of this airflow. The reverse airflow for the same configuration is shown FIGS. 7B1-7B4, while the three dimensional representation is shown in the configuration of the airflow as shown in FIG. 12. The configurations shown are for a two-pass system in this group of Figures.

In similar fashion, airflow patterns for a two-pass with a heat exchanger are shown in FIGS. 8A1 through 8B4. The specific Figures are explained in the aforementioned Brief Description of the Drawings.

Figure 8A:
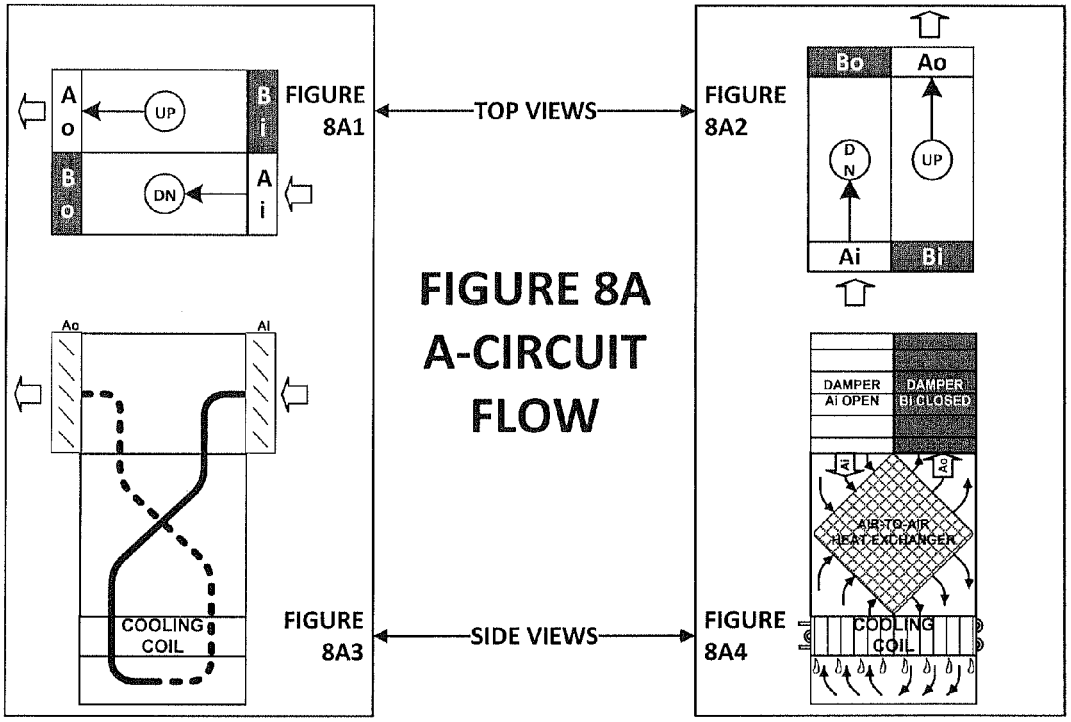
FIGS. 8A & 8B is a series of drawings that depict both A and B circuit airflow through the device, with damper positioning to achieve each, wherein the generic device is shown with heat exchangers and with a single two-pass cooling coil, and wherein one pass cooling coil is also possible as is multiple cooling coils, shown in FIGS. 3-6.
Figure 8B:
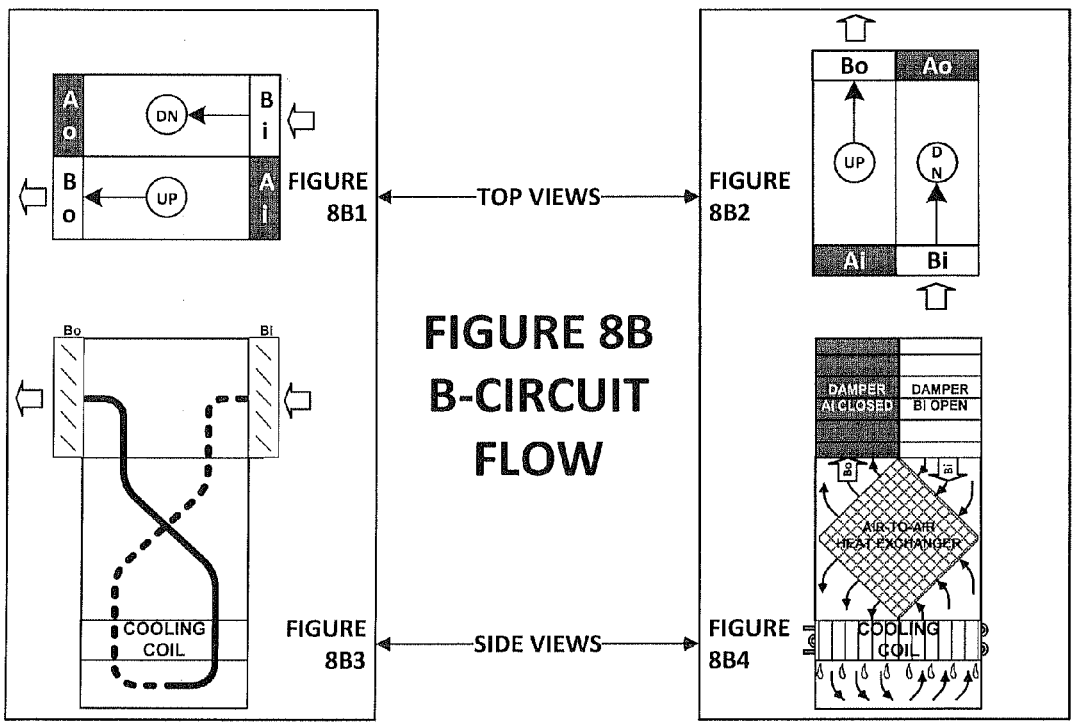

For example, FIGS. 8A & 8B show both A and B circuit airflow through the device, with damper positioning to achieve each. The generic device is shown with heat exchangers and with a single two-pass cooling coil. One pass cooling coil is also possible as is multiple cooling coils, shown in FIGS. 3-6.

Figure 3:
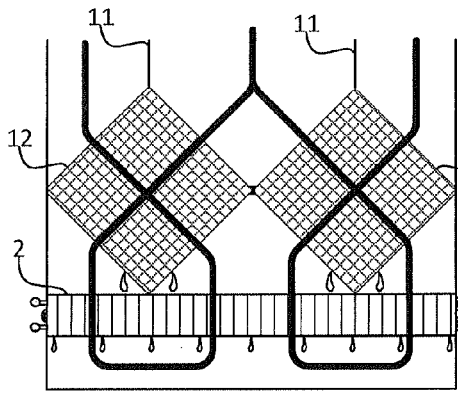
Figure 10:
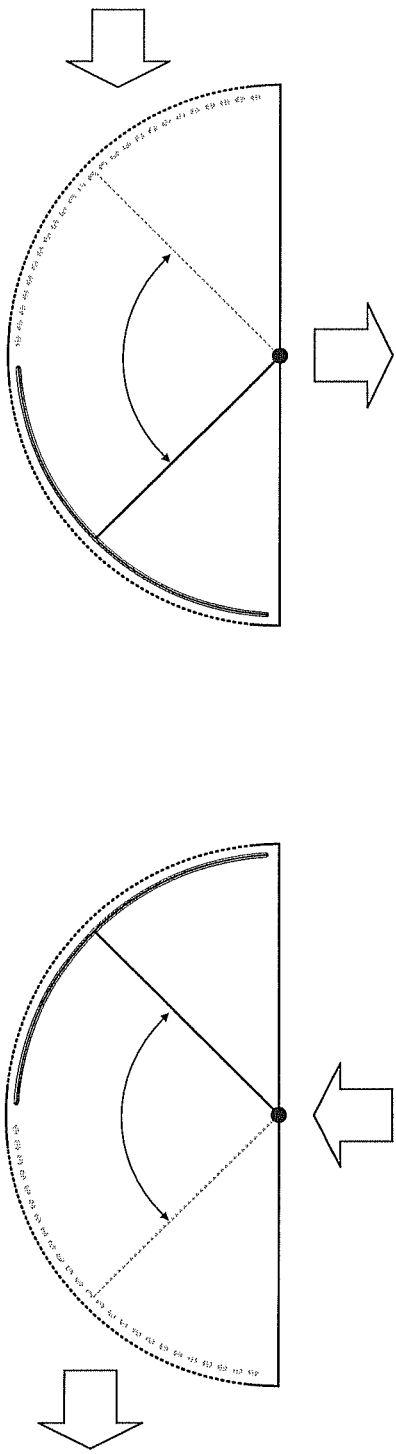

FIGS. 8A1 and 8A2 show Circuit A air entering at damper Ai, and continuing down through the cooling coil and then up, exiting at damper Ao thereby creating a flow direction through the cooling coil defined by Circuit A. FIGS. 8A3 and 8A4 show Circuit-A air entering damper Ai and continuing (solid line) through the heat exchanger and cooling coil and then turning upward (dotted line), leaving damper Ao thereby creating a flow direction through the cooling coil defined by Circuit A FIGS. 8B1 and 8B2 show Circuit B air entering at damper Bi, and continuing down through the cooling coil and then up, exiting at damper Bo thereby creating a flow direction through the cooling coil defined by Circuit B FIGS. 8B3 and 8B4 show Circuit-B air entering damper Bi and continuing (dotted line) through the heat exchanger and cooling coil and then turning upward (solid line), leaving damper Bo thereby creating a flow direction through the cooling coil defined by Circuit B FIG. 9 depicts a swing damper option, shown in two positions. FIG. 10 depicts a swing damper option, shown in two positions.

FIG. 11 shows the flow pattern through circuit A. in a three dimensional airflow internal to circuit A consistent with FIGS. 7A1-7A4.

FIG. 12 depicts the flow pattern through circuit B in a three dimensional airflow internal to circuit B consistent with FIGS. 7B1-7B4.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A device for cooling and dehumidifying an airstream to temperatures at or below freezing, while avoiding air restriction due to frost buildup in at least one cooling coil; where cooling coil inlet air is above freezing, said device comprising:

at least two opposing inlet air dampers at the device air inlet and at least two opposing outlet air dampers at the device air outlet;

said device further comprising two airflow circuits, where at least one inlet damper is in airflow communication with at least one outlet damper, through said at least one cooling coil and by alternating the dampers in each of two airflow circuits, reversal of airflow occurs through said at least one cooling coil, routing warmer inlet air to the previously cold outlet of said at least one cooling coil, while maintaining airflow in one direction through said device;

whereby air flow continues during defrosting; and whereby cooling coil airflow is reversed, and the coldest section of the cooling coil becomes the warmest, thereby promoting defrost, while also keeping the energy, given up by melting frost, in the airstream, thereby providing an energy efficient means for defrosting while not interrupting operation.

2. The device of claim 1 further comprising at least one air-to-air heat exchanger for exchanging energy between the colder air leaving said at least one cooling coil and the relatively warmer air entering said at least one cooling coil.

3. The device of claim 1, having said at least one cooling coil in each said two airflow circuits.

4. The device of claim 2, further comprising said device having said at least one cooling coil in each said two airflow circuits.

5. A device for cooling and dehumidifying an airstream to temperatures at or below freezing, while avoiding air restriction due to frost buildup in at least one cooling coil; where cooling coil inlet air is above freezing, said device comprising:

a cooling coil containing a refrigerant;

an airflow circuit passing through said cooling coil for refrigerating air in said airflow circuit, warm air entering a first end of said airflow circuit and cooled air leaving a second end of said airflow circuit; and a system of dampers for reversing air flow in said airflow circuit periodically to remove frost buildup in a cold portion of said airflow circuit whereby cooling and dehumidifying continues during defrosting without interruption.

6. The device of claim 5 in which said cooling coil has an airflow partition to separate inlet and outlet air flows.

7. A method of defrosting in a low temperature cooling and dehumidification device comprising the steps of:

passing refrigerant through a cooling coil;

flowing air to be cooled and dehumidified through said cooling coil, warm air entering one portion of said cooling coil, and cooled and dehumidified air leaving from another portion of said cooling coil; and reversing air flow in said airflow circuit periodically to remove frost buildup in a cold portion of said airflow circuit whereby cooling and dehumidifying continues during defrosting without interruption.

8. The method of claim 7 having an airflow partition to separate inlet and outlet air flows.

9. The method of claim 8 in which a system of dampers is employed to reverse air flow for defrosting.

* * * * *